United States Patent [19]
Sher

[11] Patent Number: 4,932,150
[45] Date of Patent: Jun. 12, 1990

[54] SCOOP NET FOR CATCHING FISH

[76] Inventor: Cheng-Hsien Sher, No. 18 Lane 195 Nan Tai Rd., Kaohsiung City, Taiwan

[21] Appl. No.: 381,873

[22] Filed: Jul. 19, 1989

[51] Int. Cl.⁵ .............................................. A01K 77/00
[52] U.S. Cl. ............................................ 43/7; 43/11; 43/12; 43/14; 119/5
[58] Field of Search .................... 119/5; 43/7, 11, 12, 43/14, 57

[56] References Cited

U.S. PATENT DOCUMENTS

| | | | |
|---|---|---|---|
| 2,539,563 | 6/1949 | Baloun | 43/12 |
| 2,921,397 | 1/1960 | Luthic | 43/7 |
| 3,224,131 | 7/1963 | Parse | 43/12 |
| 3,747,250 | 7/1973 | Willinger | 43/11 |
| 4,272,906 | 6/1981 | Liebling | 43/11 |
| 4,502,240 | 3/1985 | Kapucinski | 119/5 |

Primary Examiner—Kurt Rowan
Assistant Examiner—Michael William Starkweather
Attorney, Agent, or Firm—Varndell Legal Group

[57] ABSTRACT

This invention relates to a scoop net for catching fish, which includes a net coupled with a water-tight plastic fabric and connected to the scoop net frame. The plastic fabric is having one circular end adhered to the middle part of the net to define a scoop-like water chamber, and having the other elongated end fixedly connected to the curved side portion of the scoop net frame to define a water channel.

1 Claim, 4 Drawing Sheets

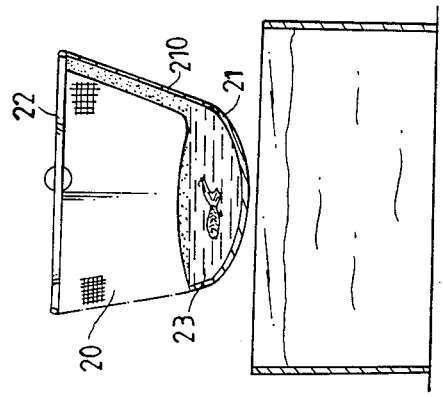
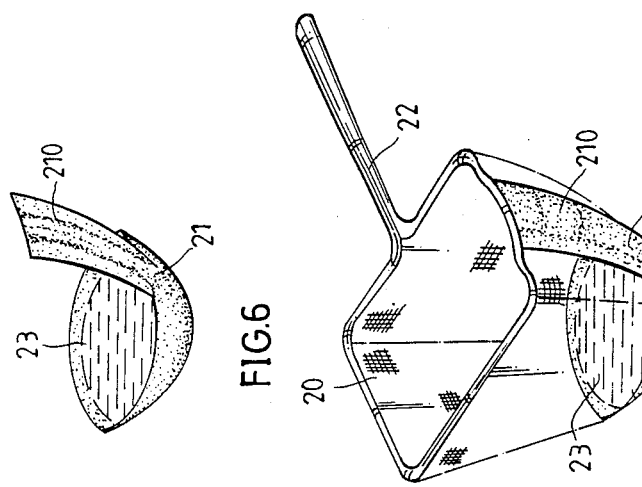

SCOOP NET FOR CATCHING FISH

BACKGROUND AND SUMMARY OF THE INVENTION

Conventional scoop net 1 which is used for taking fishes from a fish tank or the like, as illustrated in FIG. 1, is normally including a frame 10 connected thereto with a net 11. Referring to FIG. 2, when in operation, the scoop net 1 is submerged in the water to catch the fishes from fish tank. When the scoop net 1 is taken out of the water, no water is remained in the scoop net 1, and the fishes will struggle for breath due to temporarily lacking of oxygen. While struggling, the fishes may bump against the coarse net 11 of the scoop net 1, and the weak scales of the fishes may be damaged to drop. Therefore, the fishes may be hurt to death when they are removing from a fish tank or the like by a scoop net.

The main object of the present invention is to provide such a scoop net for catching fish which, is convenient to operate.

Another object of the present invention is to provide such a scoop net for catching fish, which is practical to protect the fish against hurt when the fish is caught from a fish tank or the like.

A yet further object of the present invention is to provide such a scoop net for catching fish, which is comprising a water channel for passing therethrough of water and the contained fish to facilitate the operation to remove the fish from or into a fish tank.

Therefore, a scoop net for catching fish which achieves the said objects shall include a net coupled with a water-tight plastic fabric and connected to the scoop net frame, wherein the plastic fabric is having one circular end adhered to the middle part of the net to define a scoop-like water chamber, and having the other elongated end fixedly connected to the curved side portion of the scoop net frame to define a water channel.

The above and other objects, features and advantages of the present invention will become apparent from the following detailed description of the preferred embodiment considered in connection with the annexed drawings as hereunder.

BRIEF DESCRIPTION OF THE DRAWINGS

FIG. 6 is a schematic view of the plastic fabric according to the present invention, which is arranged to serve as a water container.

FIG. 7 is a schematic view of the present invention when in service.

FIG. 8 is a sectional elevation of the present invention when in service.

FIG. 9 is a schematic drawing of the plastic fabric according to the present invention, which provides a water channel for passing therealong of the fishes contained when the fishes are been removing from fish tank or the like.

DETAILED DESCRIPTION OF THE PREFERRED EMBODIMENTS

Figure 2:
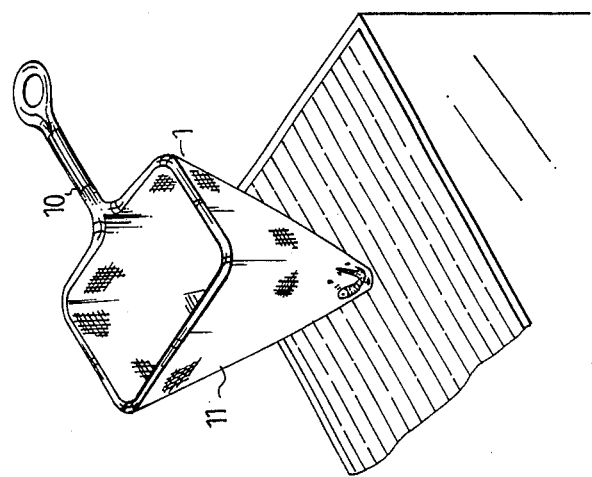
FIG. 2 is a schematic drawing of the prior art when it is in operation.
Figure 1:
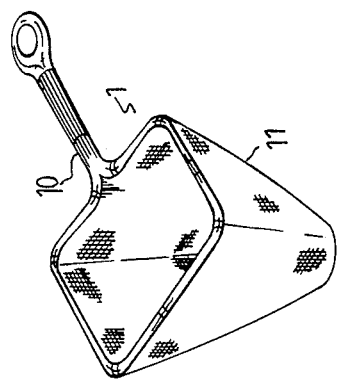
FIG. 1 is a perspective view of the prior art.
Figure 4:
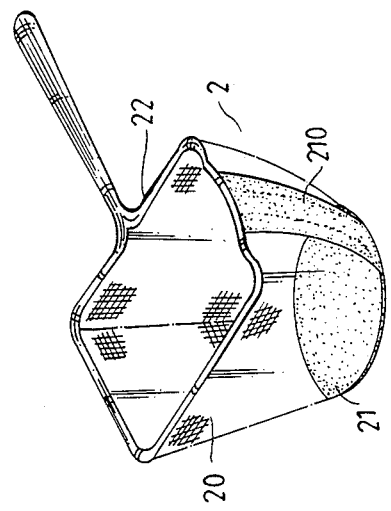
FIG. 4 is a perspective assembly view of the present invention.
Figure 5:
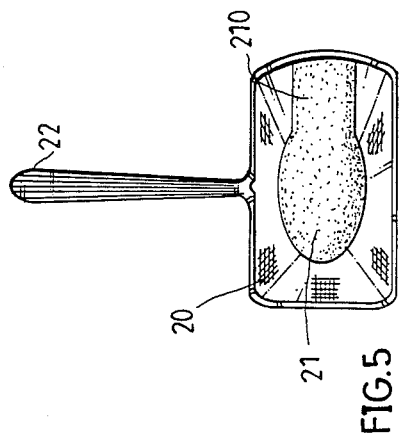
FIG. 5 is a top view of the present invention.
Figure 3:
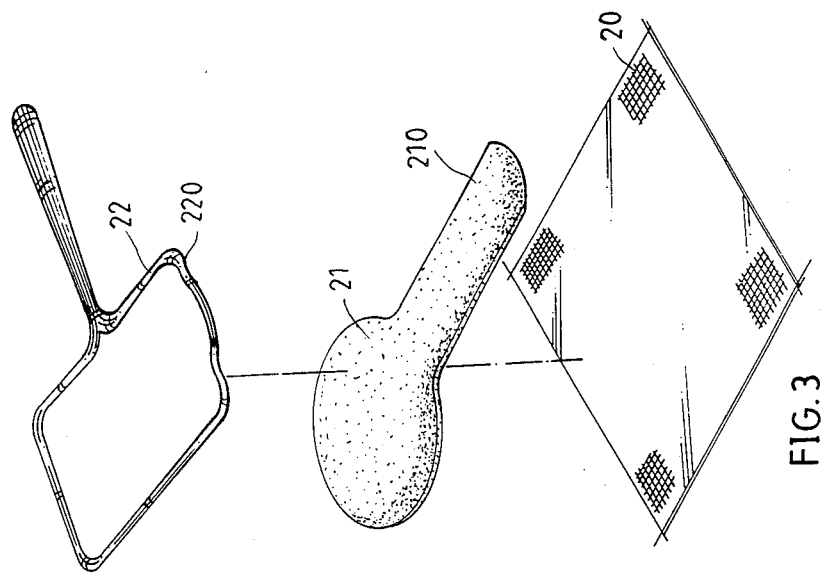
FIG. 3 is a perspective fragmentary view of the present invention.

With reference to FIGS. 3 and 4, a scoop net 2 constructed according to the present invention is including a net 20 coupled with a plastic fabric 21 and connected to a frame 22. The plastic fabric 21 is made of soft and water-tight plastic material having an elongated portion 210 connected to the curved side portion 220 of the frame 22. With reference to FIGS. 5 through 7, when in operation, the soft water-tight plastic fabric 21 forms into scoop-like shape, due to the gravity of the water contained, to define a water chamber 23 for containing water and the fishes caught, and the elongated portion 210, because it is having one end fixedly connected to the curved side portion 220 of the frame 22, is also forced to change its shape so as to define a water channel.

Figure 10:
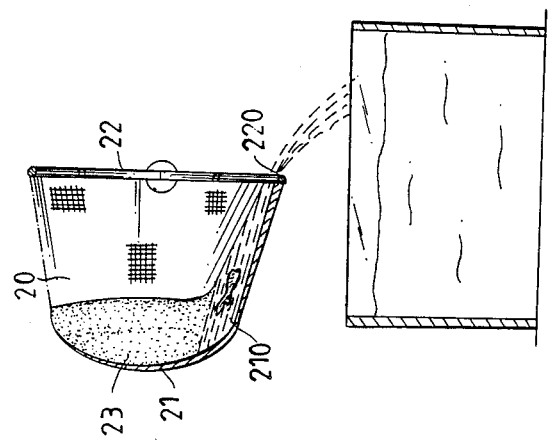
FIG. 10 is another schematic drawing of the present invention when it is in service.
Figure 9:
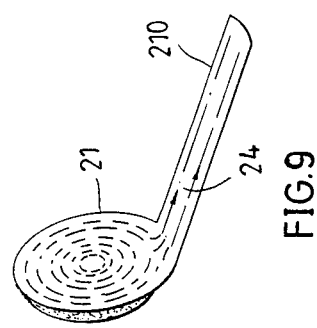

Referring to FIGS. 8 through 10, when to remove the fishes back into the fish tank again, the curved side portion 220 of the frame 22 is inclined downward to let the fishes and the water contained in the water chamber 23 be smoothly flowing into the fish tank along the water channel of the elongated portion 24 to not let the fishes be hurt or damaged.

Figure 11:
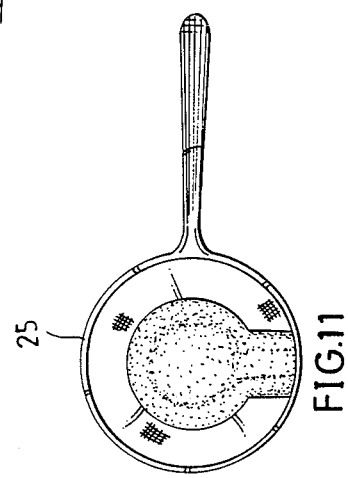
FIG. 11 illustrates another embodiment of scoop net constructed according to the present invention.

Referring to FIGS. 11 as an alternate form a scoop net 2 may include a circular frame 25 for connection thereto of the elongated portion of a soft and water-tight plastic fabric at any preferred position.

In conclusion, the present invention is to provide such a scoop net for catching fishes having numerous features to make the structure more practical in operation and to protect the fishes against hurt during catching process.

I claim:

1. A fish net for scooping fish from water comprising:
a frame attached to a handle;
a scoop net attached to said frame, and having a plastic fabric portion and a net portion; and
said plastic fabric portion comprising a cup-like chamber removed from said frame and having an upper edge substantially parallel to said frame for containing said fish in water when said frame is held parallel to a water surface, and an elongated channel connecting said cup-like chamber to said frame, for pouring said fish and water out of said channel when said frame is tipped toward a perpendicular position to said water surface.

* * * * *